United States Patent [19]

Earman et al.

[11] Patent Number: 5,319,630
[45] Date of Patent: Jun. 7, 1994

[54] LIGHT-TIGHT OPTICAL DISK CARTRIDGE

[75] Inventors: Allen M. Earman, Fairport, N.Y.; William R. A. Ziegler, Gaithersburg, Md.

[73] Assignee: Optex Corporation, Rockville, Md.

[21] Appl. No.: 812,808

[22] Filed: Dec. 24, 1991

[51] Int. Cl.$^5$ .................................................. G11B 23/03
[52] U.S. Cl. ...................................... 369/291; 360/133
[58] Field of Search .............. 369/291, 77.2; 360/133; 206/444

[56] References Cited

U.S. PATENT DOCUMENTS

| | | | |
|---|---|---|---|
| 3,810,229 | 5/1974 | Dunning et al. | 206/62 |
| 3,970,618 | 11/1990 | Kato et al. | 360/133 |
| 4,194,822 | 3/1980 | Sethi | 206/444 |
| 4,359,762 | 11/1982 | Stollorz | 360/98 |
| 4,367,503 | 1/1983 | Tresder | 360/98 |
| 4,471,397 | 9/1984 | Cloutier | 360/133 |
| 4,481,627 | 11/1984 | Marby | 369/77.2 |
| 4,497,559 | 2/1985 | Maris et al. | 354/316 |
| 4,535,434 | 8/1985 | Kishi | 369/111 |
| 4,542,495 | 9/1985 | Ziegler et al. | 369/291 |
| 4,556,969 | 12/1985 | Treseder et al. | 369/291 |
| 4,561,086 | 12/1985 | Geyer | 369/100 |
| 4,571,418 | 2/1986 | Cahill et al. | 369/291 |
| 4,584,615 | 4/1986 | Fisch | 358/332 |
| 4,587,645 | 5/1986 | Wong et al. | 369/75.1 |
| 4,636,904 | 1/1987 | Matsuno | 360/133 |
| 4,652,961 | 3/1987 | Dieffenbach | 360/133 |
| 4,778,558 | 10/1988 | Kanda | 360/133 |
| 4,782,718 | 11/1988 | Tanaka et al. | 360/133 |
| 4,797,770 | 1/1989 | Takahasi | 369/291 |
| 4,814,924 | 3/1989 | Ozeki | 360/133 |
| 4,852,078 | 7/1989 | Miller | 369/291 |
| 4,853,925 | 8/1989 | Kaneuchi | 369/291 |
| 4,864,536 | 9/1989 | Lindmayer | 365/119 |
| 4,899,244 | 2/1990 | Morse | 360/133 |
| 4,918,559 | 4/1990 | Maruyama et al. | 206/444 |
| 4,945,530 | 7/1990 | Sandell et al. | 369/291 |
| 4,965,691 | 10/1990 | Iftikar et al. | 360/133 |
| 4,972,404 | 11/1990 | Yamaguchi et al. | 369/284 |
| 4,974,103 | 11/1990 | Iftikar et al. | 360/97.01 |
| 4,991,717 | 2/1991 | May et al. | 206/455 |
| 5,003,333 | 3/1991 | Earnhart | 354/218 |
| 5,043,974 | 8/1991 | Nakagawa | 369/291 |
| 5,048,008 | 9/1991 | Haruna | 369/291 |
| 5,081,556 | 1/1992 | Ikebe et al. | 360/133 |
| 5,113,387 | 5/1992 | Goldsmith et al. | 369/44.38 |

FOREIGN PATENT DOCUMENTS

| | | | |
|---|---|---|---|
| 203642 | 11/1983 | Japan | 369/291 |
| 2-148463 | 1/1990 | Japan | |
| 2-24890 | 6/1990 | Japan | |

Primary Examiner—Stuart S. Levy
Assistant Examiner—Paul J. Ditmyer
Attorney, Agent, or Firm—Wigman, Cohen, Leitner & Myers

[57] ABSTRACT

A light-tight optical disk cartridge is disclosed for use with ETOM erasable and other optical disks in which light baffles incorporating a snap lock feature are utilized in the assembly of the optical disk cartridge in order to provide structural integrity to the cartridge as well as to prevent the entry of light into the cartridge. A snap close slide and latching mechanism is incorporated in order to prevent accidental opening of the access mechanism of the optical disk cartridge.

24 Claims, 10 Drawing Sheets

LIGHT-TIGHT OPTICAL DISK CARTRIDGE

BACKGROUND OF THE INVENTION

The present invention relates to removable cartridges for carrying optical disks in which the cartridge can be readily inserted into an optical disk drive and be usable for all purposes as if the optical disk were fixed within the optical disk drive.

More particularly, the present invention is directed to a light-tight optical disk cartridge designed to be used with optical media, such as electron trapping optical materials (ETOM), which are light sensitive.

Optical storage devices for use in storing computer and other data are well known in the art. Such devices are desirable because of their ability to store vastly more information per disk than known magnetic storage devices. While most of the known optical disk drive devices perform read-only functions, there are presently known write-once-read-many times (WORM) and erasable optical memory systems. All of the known (with the exception of the instant assignee) erasable optical storage device technologies involve techniques that require heat, which usually changes the physical or chemical structure of the materials in performing the write or erase function. In addition, performance of the media utilized with such approaches can easily be degraded over time due to the high sensitivity of the media to impurities, impurity diffusion, oxidation and other imperfections that propagate into defects which may only show up after multiple switching cycles or after the manufacturing and testing of the devices.

In order to overcome the problems of prior art erasable optical disk drives, the assignee of the present invention has developed a new approach to optical disk storage in which the optical storage materials which provide the storage function of the erasable optical disk drive utilize electron trapping optical materials The electron trapping phenomenon is embodied by a class of materials which comprise an alkaline earth crystal typically doped with rare earth elements Thin crystalline forms of such materials may be formed on various substrate structures, such as glass or aluminum, in order to provide the disk storage medium.

Since the trapping phenomenon is a purely electronic process, read, write and erase operations can be performed in very short periods of time. In addition, the physical trapping phenomenon appears to offer a practically limitless media life.

The materials which may be used as the media for the optical disk described herein are the subject of, for example, U.S. Pat. Nos. 4,864,536 and 4,830,975. Other examples of materials useful as storage media on the ETOM optical disk described herein are disclosed in U.S. Pat. Nos. 4,839,092, 4,806,772 and 4,842,960. The disclosure of each of those patents is incorporated by reference herein.

Reference is made to each of the foregoing issued United States patents for an expanded discussion of the electron trapping and electron trapping optical memory media phenomena.

Known removable magnetic and optical disks have typically used several types of cartridge designs ranging from folded plastic sleeves for magnetic floppy disks to injection molded plastic casings with slide shutters for optical disks All of these designs are suited specifically for their individual application. They all have some features in common. All of these known designs provide a means of handling the disks without damaging the enclosed disk. They all also provide a method of maintaining environmental contaminants at a minimum while at the same time providing access to the center clamping hub for rotating the disk. Obviously, all of such magnetic and optical disk cartridge designs are removable from the disk drive with which they are used.

All of the known hard-cased disk cartridges are typically assembled using plastic pins molded into the corners of the casing. That method of assembly functions well for magnetic and optical media having a moderate or low sensitivity to light. Such disk cartridges are of a sturdy and functional design, which prevents fingerprints, dust and rough handling from damaging the information stored on the disk. However, such prior art cartridge designs do not provide, nor do they even consider providing, any method for preventing ambient light from reaching the enclosed disk.

U.S. Pat. No. 4,535,434, to Kashi, relates to a rotating optical disk in an environmentally sealed cartridge in which access to the disk is accomplished through a transparent section in the cartridge casing.

U.S. Pat. No. 4,542,495, to Ziegler et al., one of the co-inventors herein, relates to a sealed cartridge for an optical disk in which a window is utilized rather than a shutter through which the beams from the optical read/write head pass without opening the cartridge and exposing the disk to dust and other contaminants U.S. Pat. No. 4,853,925, to Kaneuchi, relates to a cartridge for an information memory medium which includes a locking shutter fitted into parallel guide grooves in the slide direction. This patent also discloses sliding write protect tabs and a return spring activated locking mechanism.

U.S. Pat. No. 5,048,008, to Haruna, relates to a disk cartridge for either magnetic or optical media in which a split shutter is utilized. The two halves of the shutter slide apart to reveal the active surface of the disk. Dual coiled springs are utilized to operate the shutters.

U.S. Pat. No. 4,367,503, to Treseder, relates to a hermetically sealed magnetic disk container for holding a plurality of platters mounted on a spindle. The seal is designed to protect the disks from contamination by particulates.

U.S. Pat. No. 4,991,717, to May, relates to a light and moisture resistant packet for photographic sheet film which utilizes a hermetic adhesive seal having a reusable membrane.

U.S. Pat. No. 4,945,530, to Sandell, relates to a cartridge for optical data disks which has dual sliding doors mounted to a slider for movement in a groove formed by the cartridge halves. A locking lever is provided which prevents the disk from rotating when not in use.

U.S. Pat. No. 4,782,418, to Tanaka, relates to a disk cartridge having an elongated cover plate which is adapted to thoroughly and sealedly cover a slot of the disk cartridge.

U.S. Pat. No. 4,571,718, to Cahill et al., relates to a sealed magneto-optical disk cartridge with a magnetic hub. The disk is actuated through a transparent section of the cartridge.

SUMMARY AND OBJECTS OF THE INVENTION

In view of the foregoing, it should be apparent that there still exists a need in the art for an apparatus for providing an optical disk cartridge assembly which includes a mechanism for preventing ambient light from reaching the surface of the disk in a simple and precise manner. It is, therefore, a primary object of this invention to provide apparatus for preventing ambient light from reaching the surface of an optical disk, as well as keeping the entrance of environmental contaminants at a minimum such that little, if any, contamination of the optical disk occurs.

More particularly, it is an object of this invention to provide an optical disk cartridge which prevents ambient light from reaching the surface of the optical disk contained within the cartridge in a simple and reliable manner.

Still more particularly, it is an object of this invention to provide a cartridge design for an optical disk which prevents light from reaching the surface of the disk and which forms a sturdy and long-lasting cartridge assembly when manufactured.

Another object of the present invention is to provide a reliable and relatively inexpensive cartridge for an optical disk in which ambient light is prevented from reaching the surface of the disk.

A further object of the present invention is to provide a disk cartridge for an ETOM disk utilizing light baffles incorporated into the cartridge which thus prevent the charging or discharging of the media carried on the disk.

Briefly described, these and other objects of the invention are accomplished by a cartridge containing one or more ETOM disks which are loaded into an optical drive. After loading the cartridge into the optical drive, an access door closes behind the cartridge which places the cartridge into a light tight chamber. At that point, the cartridge may be safely opened without charging or discharging the ETOM media on the disk.

After the drive access door has closed, the cartridge is moved to access the drive motor, and an enabling pin engages the slide latch. The cartridge access door slides open, thus exposing the disk and its attached hub. The hub is then engaged to the spindle and the drive optics have access to the exposed surface of the disk. Upon removal, the above described process is reversed, thus maintaining the light integrity of the cartridge.

With these and other objects, advantages and features of the invention that may become hereinafter apparent, the nature of the invention may be more clearly understood by reference to the following detailed description of the invention, the appended claims and the several drawings attached herein.

DETAILED DESCRIPTION OF THE PREFERRED EMBODIMENT

Figure 1:
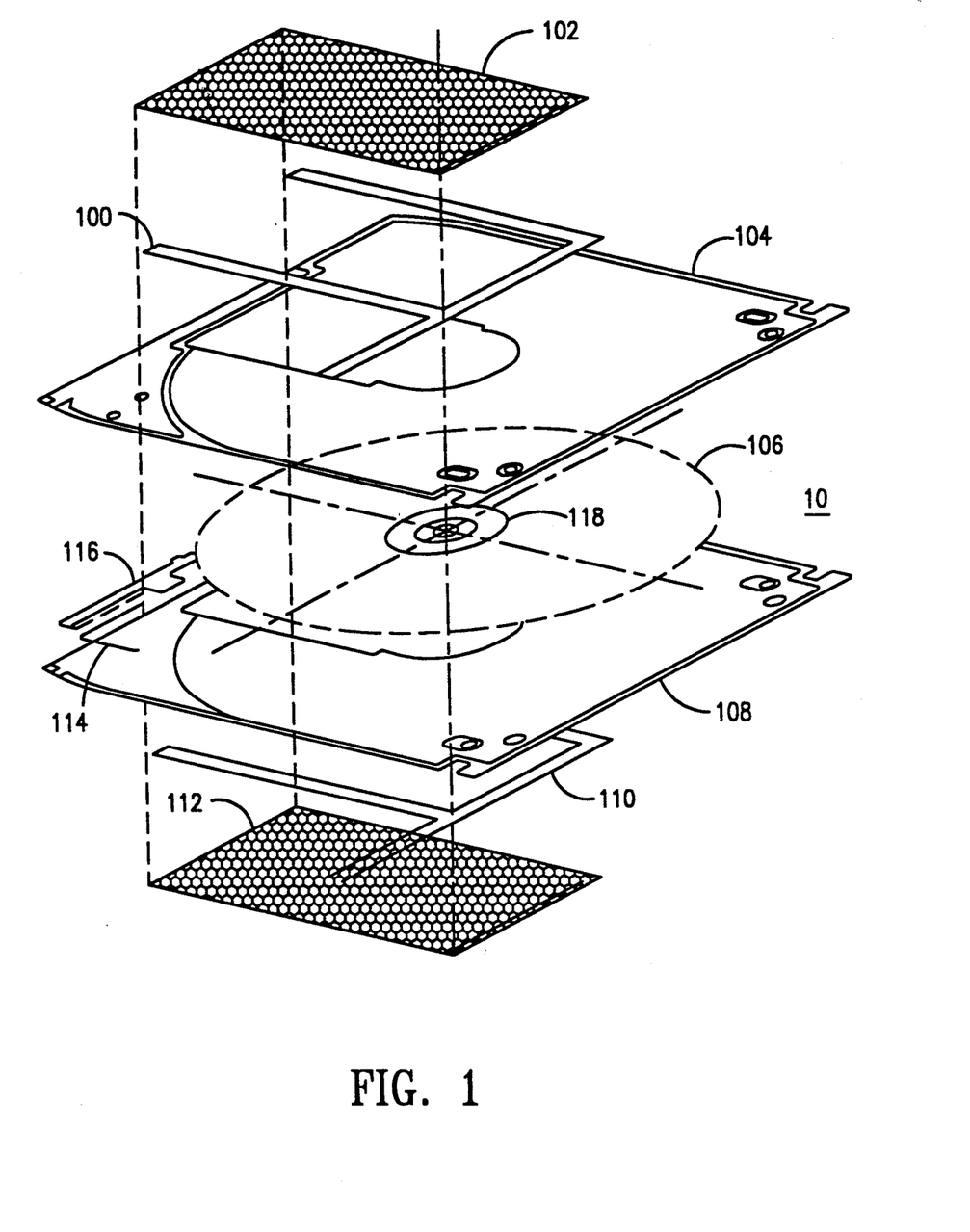
FIG. 1 is a drawing of an exploded view of the cartridge of the assembly of the present invention showing the relationship of the various component parts.

Referring now in detail to the drawings wherein like parts are designated by like reference numerals throughout, there is illustrated in FIG. 1 an exploded drawing of the light-tight optical disk cartridge 10 of the present invention. There are nine main components of the light-tight optical cartridge 10, including the top 104 and bottom 108 of the cartridge, which may be formed from injection molded plastic or other suitable material. The ETOM disk 106 may be mounted in the optical cartridge 10 in any suitable manner known in the art. In particular, the disk 106 may be mounted to a hub which complies with ANSI Standard X3B11/90-165, in a known manner.

The top and bottom slide rails 100 and 110, respectively, are attached by suitable means to the top 104 and bottom 108 of the light-tight cartridge 10. Such top and bottom slide rails 100 and 110 serve to provide a guide for the top 102 and bottom 112 of the slide 103, which slide respectively in the top and bottom slide rails 100 and 110.

FIG. 1 also shows the location of the slide/latch return spring 114 as well as the slide/latch assembly 116.

Figures 2A, 2B, 2C, 2D, 2E, 2F, 2G:
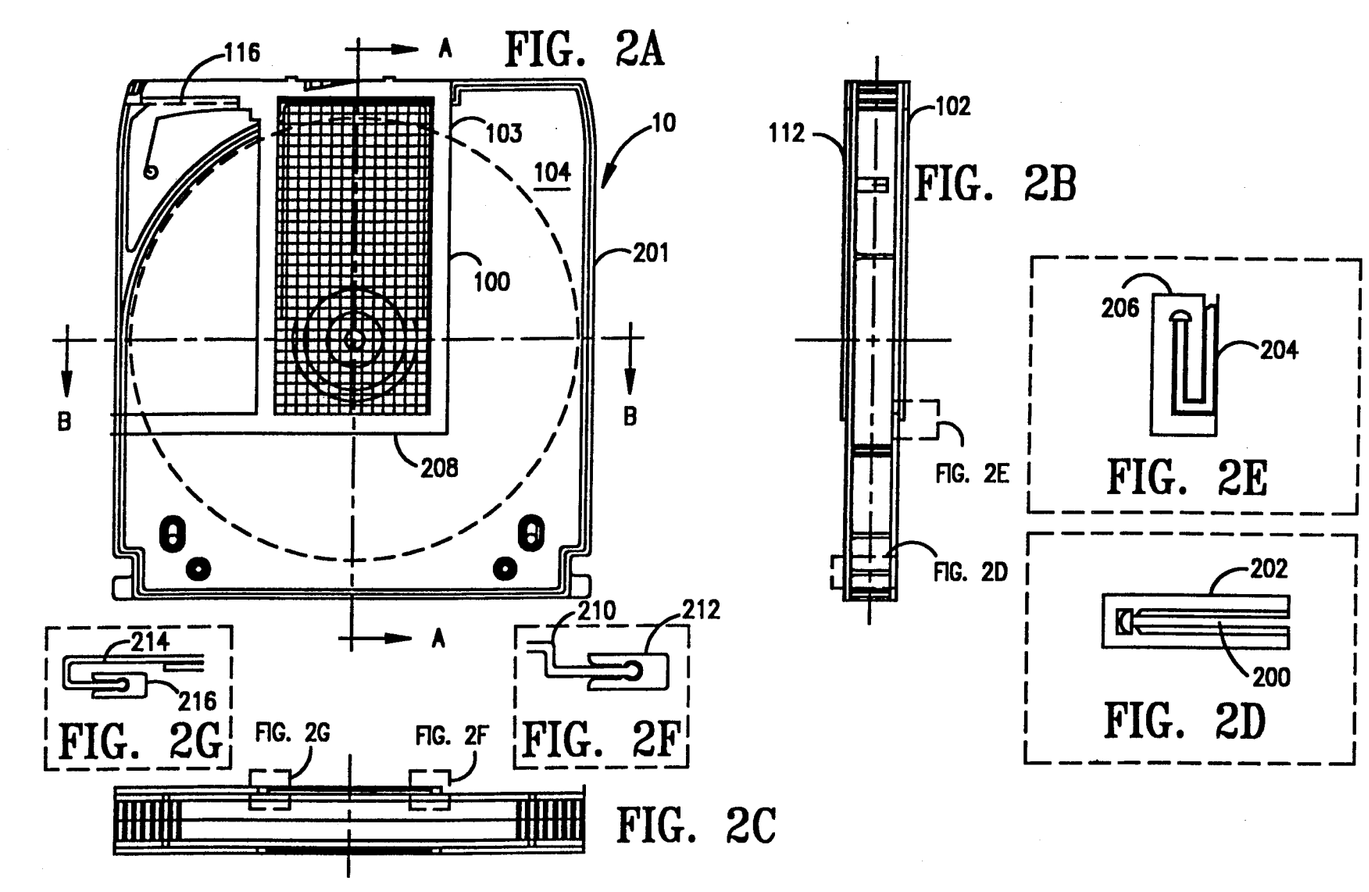
FIG. 2A is a drawing showing the assembled cartridge.
FIG. 2B is a drawing of the cartridge of FIG. 2A taken along the line A—A.
FIG. 2C is a drawing of the cartridge of FIG. 2A taken along the line B—B.
FIG. 2D is a detail drawing showing the attachment of the cartridge top and the cartridge bottom light baffle configuration.
FIG. 2E is a drawing of the slide attachment to the slide rail.
FIGS. 2F and 2G are drawings of the light baffles at the ends of the slide shown in FIG. 2A where the slide snaps into the slide rail as the slide is closed over the media disk and hub assembly.

FIGS. 2A-C show various views of the assembled cartridge 10. FIG. 2D shows a cross-section of the continuous seam 201 which is formed by the edge bead 200 mating with the edge baffle 202 of the cartridge top 104 to the cartridge bottom 108 which cartridge bottom 108 includes the edge bead 200. The edge seam 201 is formed where the edge bead 200 is secured in the baffle 202. The continuous edge bead 200 is molded as part of the cartridge bottom 108 and a continuous light baffle 202 is molded in corresponding positions on the inner side of the cartridge top 104. The light baffle 202 serves to prevent light from entering the cartridge around the bottom half edge by which the two halves of the hard-cased cartridge are secured together.

Known hard-cased disk cartridges have typically been assembled using plastic pins molded into the corners of the two casing pieces, which does not provide any mechanism for preventing ambient light from entering the cartridge through the use of such corner pins or, alternatively, screws, for fastening the components of the cartridge together. In the configuration shown in FIG. 2D, ambient light must reflect from the several black surfaces around each turn of the light baffle 202 in order to penetrate the cartridge seam and enter the chamber where the disk 106 is located. Thus, the present design effectively eliminates seepage of any ambient light through the fastening means by which the components of the cartridge 10 are secured together.

FIG. 2E shows the detail of the attachment of the slide 103 to the slide rails 100, 110. A seam edge 204 is formed as part of the slide top and bottom 102, 112. The seam edge 204 is secured in a light baffle 206 which is formed by a portion of the top and bottom slide rails 100, 112. For purposes of illustration, the portion of the top slide rail 100 which is formed into the light baffle 206 is indicated as element 208 in FIG. 2A.

FIGS. 2F and 2G illustrate the light baffles 216 and 212 at the edges of the slide rails 100 and 110 where the slide 103 "snaps" into the slide rail 100, 110 as the slide top and bottom 102, 112 are closed over the media disk 106 and hub 118 assembly.

Figure 3A:
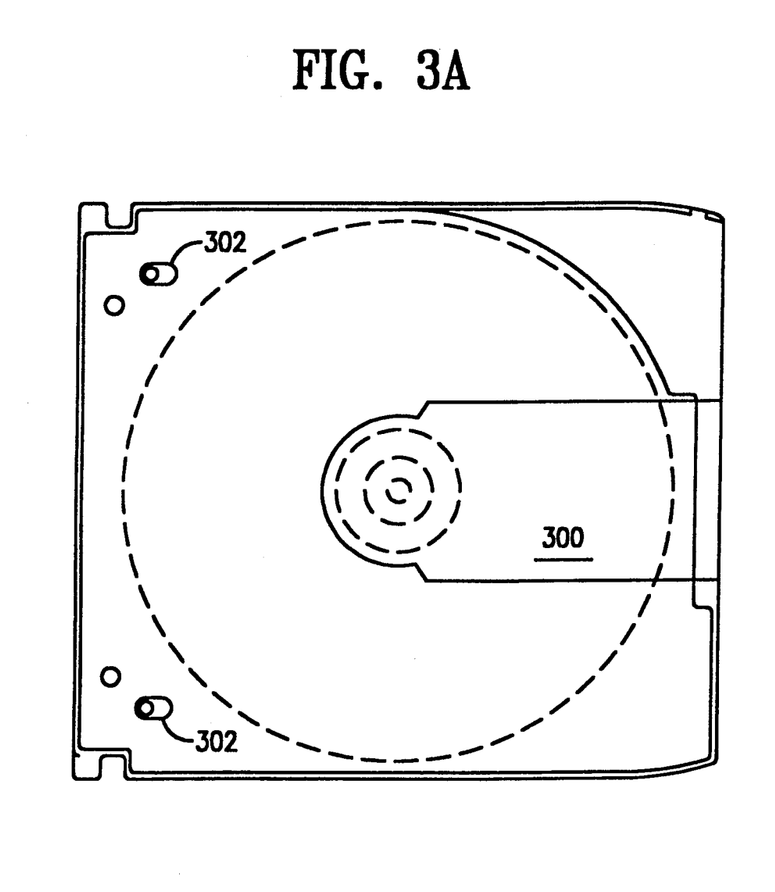
FIG. 3A is a drawing showing the plane view of the bottom of the cartridge.
Figure 3B:
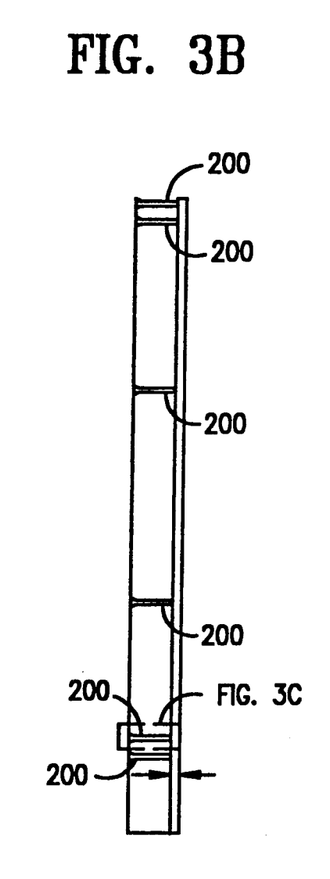
FIG. 3B is a drawing showing a side view of the cartridge bottom of FIG. 3A.
Figure 4A:
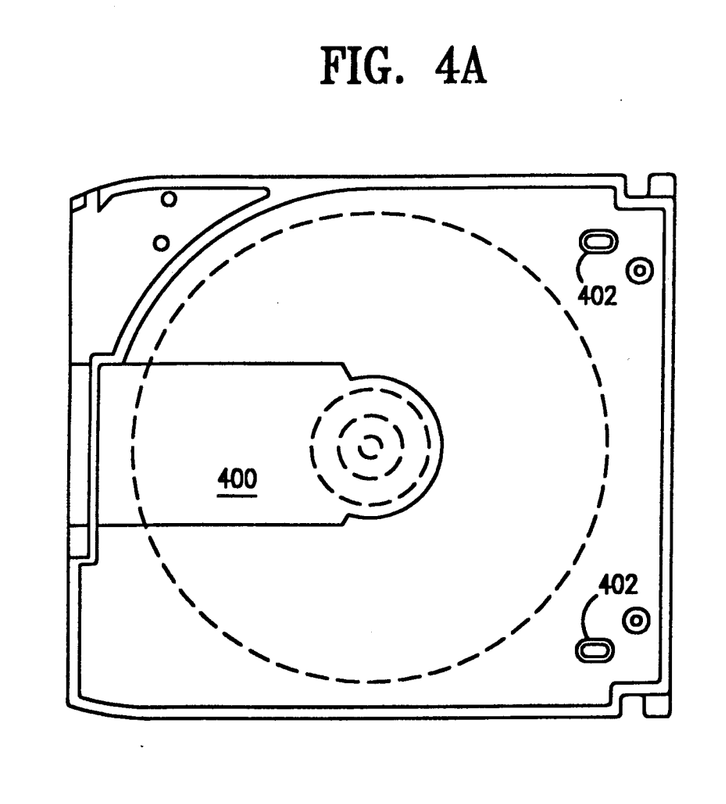
FIG. 4A is a drawing of a plane view of the cartridge top.

FIGS. 3A and 3B show a top view of the inside of the cartridge bottom 108 and a front view of the cartridge bottom 108, respectively. An opening 300 for the access of the spindle mechanical interface as well as the optical read/write/erase head is formed as shown in a central location on the cartridge bottom 108. "Write protect tabs" are provided in the form of slots 302 in the cartridge bottom 108 such that the position of such tabs can be sensed by the drive mechanism or disk drive (not shown) into which the disk cartridge 10 is placed to determine whether or not a write operation may be performed on a particular side of the disk. As shown in FIGS. 3A and 4A, there is one "write protect tab" for each side of the disk 106. Such tabs 302 and 402 (as shown in FIG. 3A) comply with ANSI Standard X3B11/90-165.

Figure 3C:
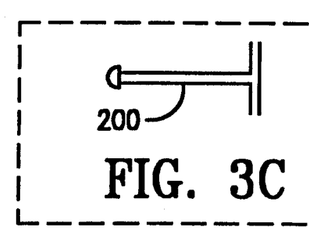
FIG. 3C is a drawing of the "male" portion of the light-tight seam shown in FIG. 3B which is used to attach the cartridge bottom shown in FIG. 3A to the cartridge top.

As previously discussed, the male portion 200 of the light-tight seam for attachment to the cartridge top 104 component is shown in cross-section in greater detail in FIG. 3C.

Figures 4B, 4C:
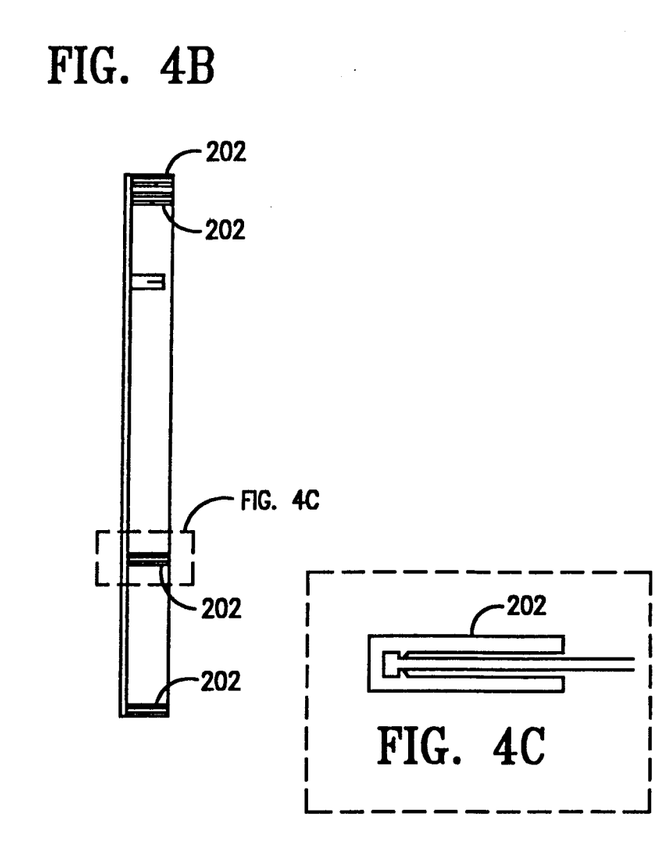
FIG. 4B is a drawing showing a side view of the cartridge top of FIG. 4A.
FIG. 4C is a drawing of the "female" portion of the light-tight seam for attachment to the cartridge bottom of FIG. 3A.

FIGS. 4A and 4B are respectively top and front views of the cartridge top 104. The cartridge top has an opening 400 which provides access for the spindle mechanical interface and the optical read/write/erase head whenever the optical disk cartridge 10 is turned over to provide access to the other side of the disk 106. The opening 400 in the cartridge top 104 corresponds to the placement position of the opening 300 in the cartridge bottom 108. A plurality of "write protect tabs" 402 is provided in the cartridge top 104 and perform the same function with respect to the other side of the disk 106 as described in connection with FIG. 3A.

FIG. 4C illustrates in detail the light baffle 202 or "female" portion of the light-tight seam for attachment of the cartridge top 104 to the cartridge bottom 108. Both the cartridge top and bottom are preferably formed from PVC or other opaque injection molded material.

Figure 5A:
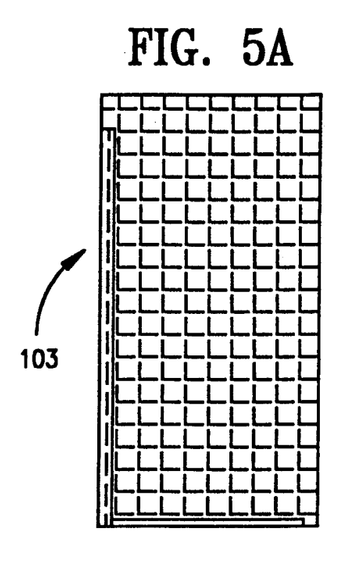
FIG. 5A is a drawing of the plane view of the cartridge slide.
Figure 5B:
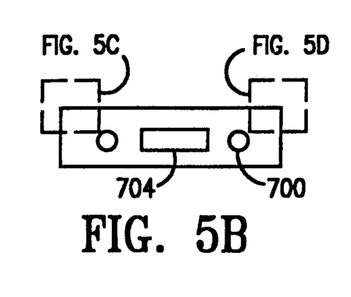
FIG. 5B is a drawing of an end view of the cartridge slide.
Figure 5C:
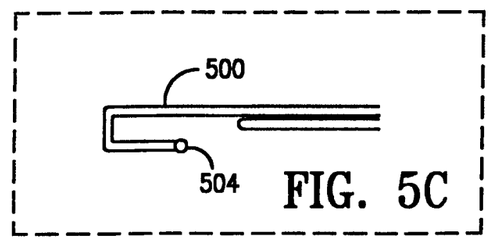
FIGS. 5C and 5D are drawings showing the details of the snap closure points on the slide shown in FIG. 5A.
Figure 5D:
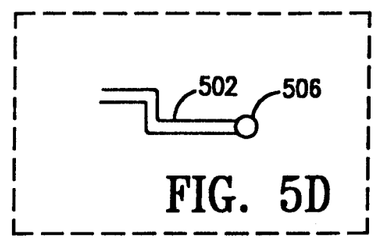
Figure 5E:
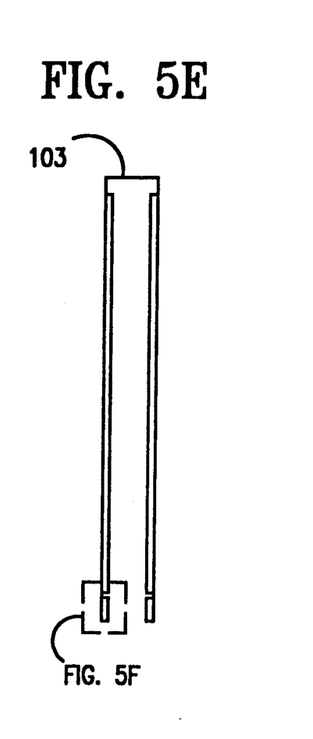
FIG. 5E is a drawing of a side view of the cartridge slide.

FIGS. 5A-5F show the details of the cartridge slide 103 whose top 102 and bottom 112 are shown in FIG. 1. The cartridge slide 103, which may be formed from 32 gauge stainless steel, acts as an access door for the cartridge 10. The slide 103 is formed from a single piece of material which folds over at the front end of the cartridge 10 and covers both access openings 300 and 400 simultaneously. FIGS. 5C and 5D show the details of the snap closure points on the slide 103. The U-shaped edge 500 of the longitudinal length of the slide 103 and the L-shaped edge 502 which runs along the width of the back of the slide 103 each utilize rounded edges 504, 506 to provide a soft snap into the respective slide rails 100, 110 as the slide 103 is slid closed over the spindle and head access openings 300, 400.

Figure 5F:
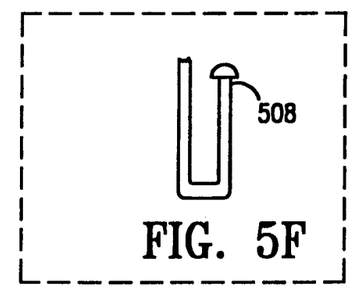
FIG. 5F is a drawing showing the detail of the male end of the slide where it attaches to the slide rail.

FIG. 5F shows the male end 508 of the slide 103 where it attaches to the slide rails 100, 110, for the purpose of sliding open or closed.

Figure 6A:
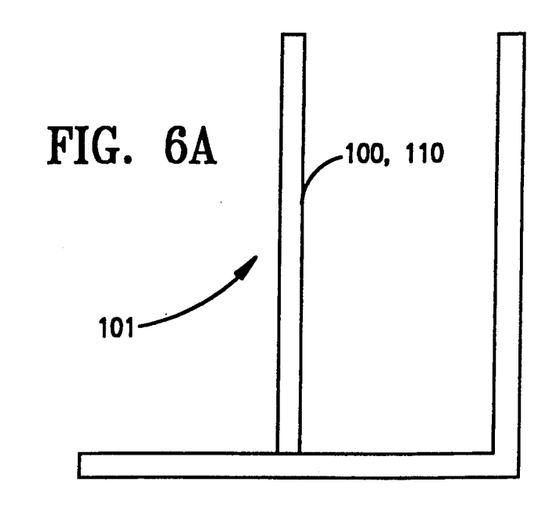
FIG. 6A is a drawing of the plane view of the cartridge slide rail.
Figure 6B:
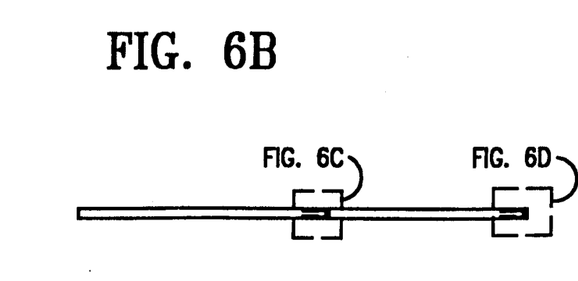
FIG. 6B is a drawing of the front view of the cartridge slide rail of FIG. 6A.
Figure 6C:
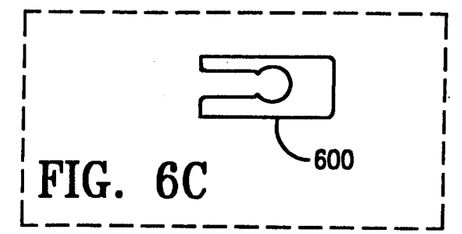
FIGS. 6C and 6D are drawings showing the mating female portions for the corresponding parts of the cartridge slide shown in FIGS. 5C-5D.
Figure 6D:
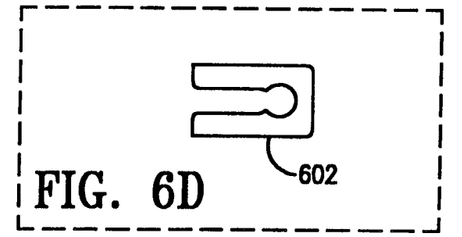
Figure 6E:
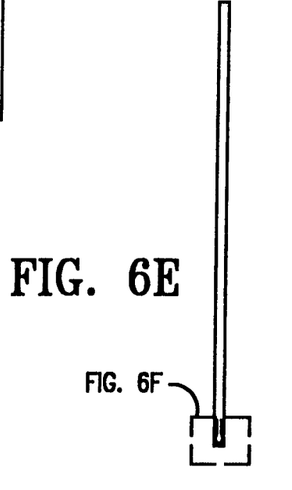
FIG. 6E is a drawing of the left side view of the cartridge slide rail shown in FIG. 6A.
Figure 6F:
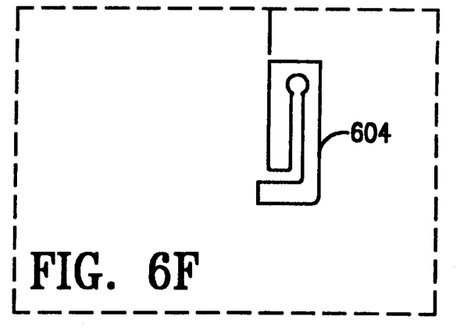
FIG. 6F is a drawing of the mating portion of the slide track which mates with the part of the slide shown in FIG. 5F.

FIG. 6A is a drawing of the top view of the cartridge slide rail 101. The top 100 of the slide rail 101 is glued to the cartridge top 104 while the bottom slide rail 110 is glued to the cartridge bottom 108. The slide rail 101 serves the function of supporting the moving slide 103. FIGS. 6C and 6D show the mating female portions for the corresponding parts 500 and 502 of the slide 103 shown in FIGS. 5C and 5D. FIG. 6F shows the detail of the slide track 101 which forms the mating portion 604 of the corresponding part 508 of the slide 103 shown in FIG. 5F.

Figure 7A:
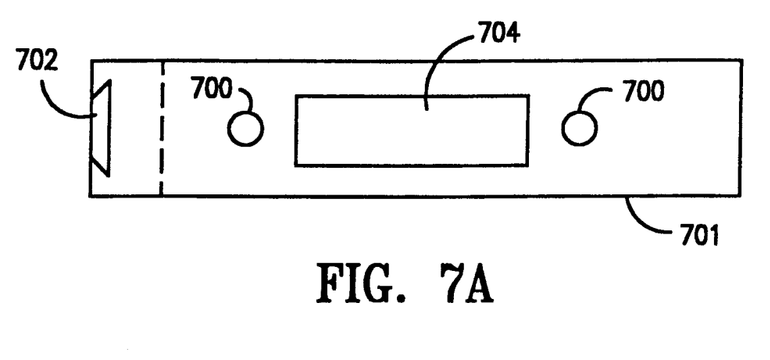
FIGS. 7A and 7B are drawings respectively of the front and top views of the slide support component to which the slide is attached and which resides at the edge of the optical disk cartridge of the present invention.
Figure 7B:
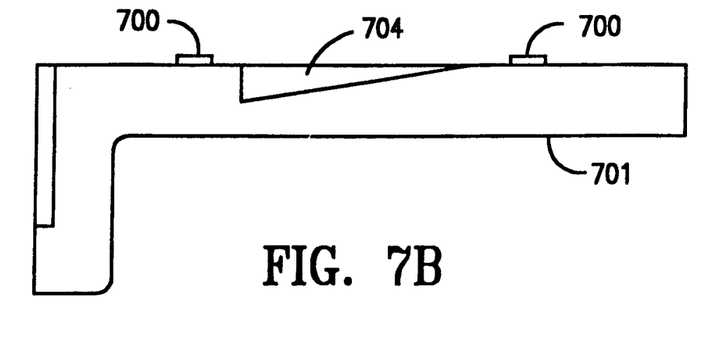

FIGS. 7A and 7B show the slide support 701 which is positioned at the front edge of the disk cartridge 10 between the assembled cartridge top 104 and cartridge bottom 108 and the slide 103. The raised knobs 700 shown in FIGS. 7A and 7B are positioned in corresponding holes in the slide 103 of FIG. 5 and are used to attach the slide 103 to the slide/latch assembly 116. A dovetail groove 702 located in one end of the slide/latch assembly 116 allows for the motion of the latch component 800 which, together with the slide support 701, forms the slide/latch assembly. A sloping indenture 704 is formed in one leg of the slide support 701 and provides a mechanical interface for the slide opening mechanism of the disk drive (not shown) into which the optical disk cartridge 10 of the present invention is inserted.

Figure 8A:
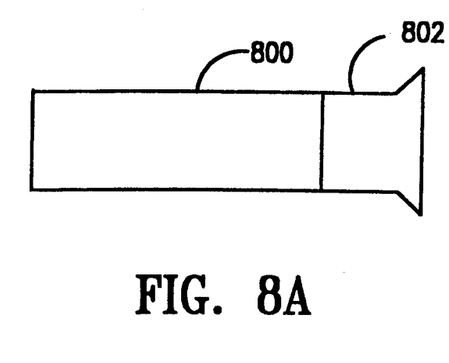
FIGS. 8A and 8B are drawings of, respectively, front and top views of the latch which mechanically interfaces to the slide support of FIGS. 7A-7B of the optical disk cartridge of the present invention.
Figure 8B:
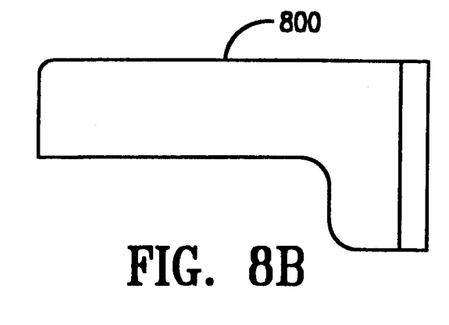

FIGS. 8A and 8B show the latch component 800 of the slide/latch assembly 116 of the optical disk cartridge 10 of the present invention. The latch component 800 is mechanically interfaced to the slide support 701 by means of the dovetail 802 which fits into the corresponding dovetail groove 702 of the slide support 701. The latch 800 serves to prevent accidental opening of the cartridge 10 while the cartridge is outside of the disk drive environment.

Figure 9A:
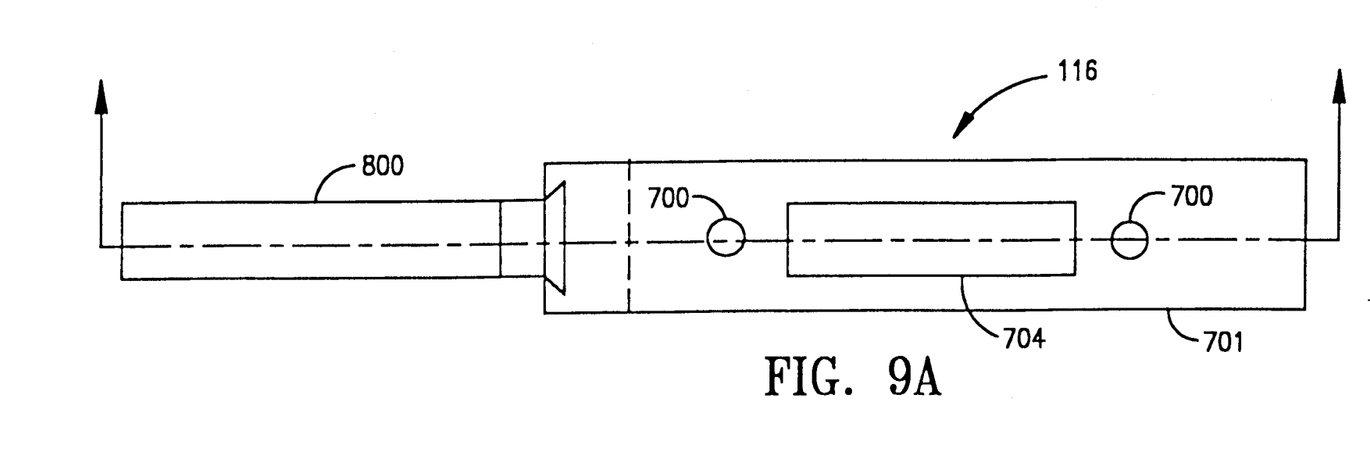
FIG. 9A is a drawing of the front of the assembled slide support and latch utilized with the optical disk cartridge of the present invention.
Figure 9B:
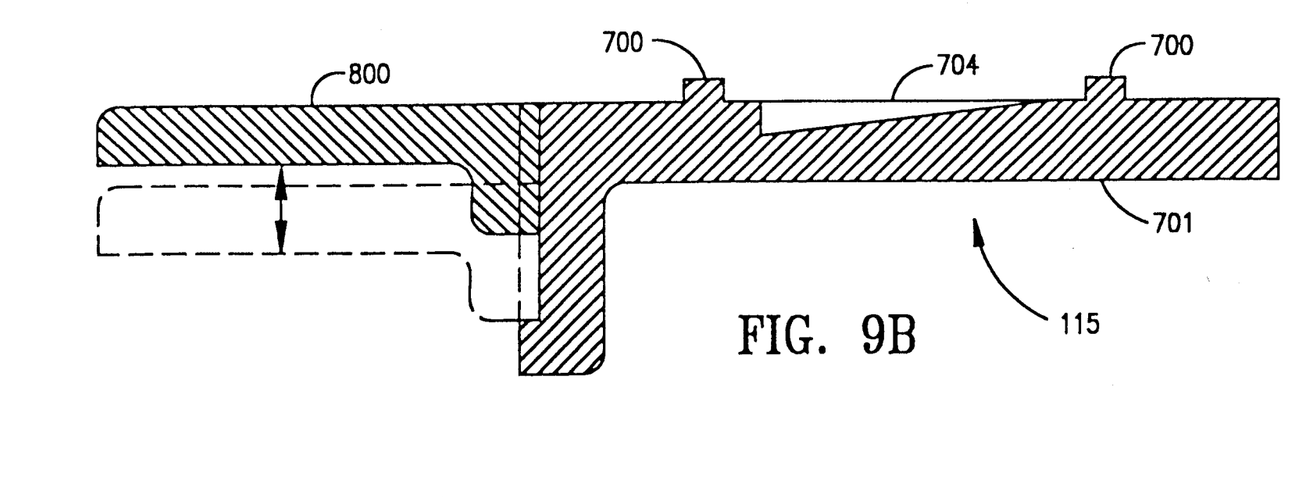
FIG. 9B is a drawing of FIG. 9A taken along the line A—A.

The entire slide/latch assembly 116 is shown in FIGS. 9A and 9B. As shown in FIG. 9B, the latch 800 slides vertically within the dovetail groove 702 in order to allow lateral motion of the slide support 701 to open the cartridge door formed by the slide 103.

Figure 10A:
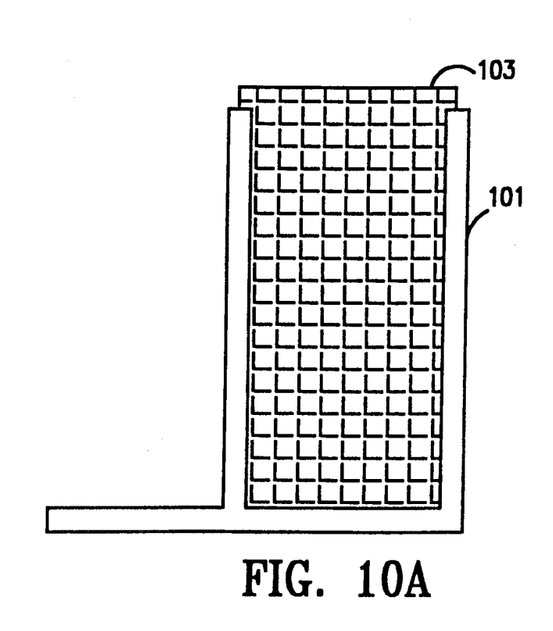
FIG. 10A is a drawing of a top view of the cartridge slide and cartridge slide rail assembly of the optical cartridge of the present invention.
Figure 10B:
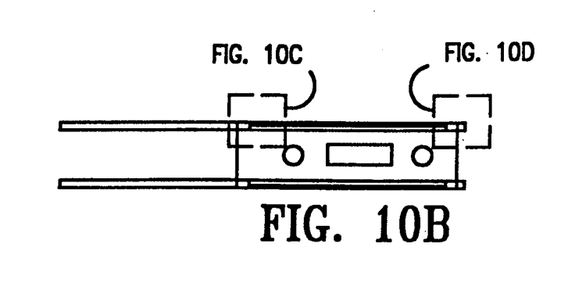
FIG. 10B is a drawing of the front view of the cartridge slide and cartridge slide rail assembly of the optical cartridge of the present invention.

FIG. 10A illustrates the assembled slide 103 and slide rail 101 assembly and shows the mechanical interface of those two components.

Figure 10C:
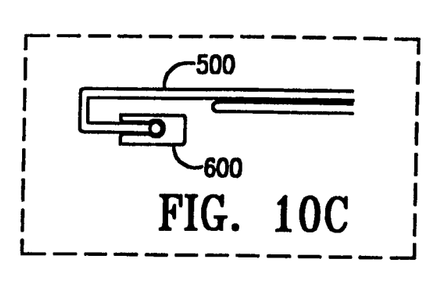
FIGS. 10C and 10D are drawings showing the snap-close interface of the cartridge slide.
Figure 10D:
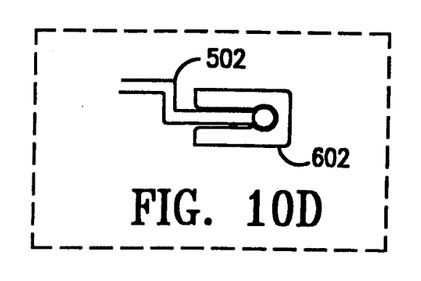
Figure 10E:
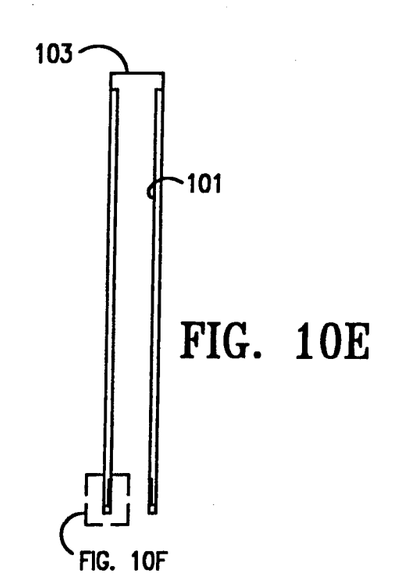
FIG. 10E is a drawing of a side view of the cartridge slide and cartridge slide rail assembly shown in FIG. 10A.
Figure 10F:
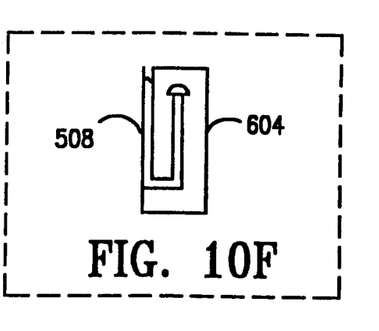
FIG. 10F is a drawing of the sliding interface of the cartridge slide in the cartridge slide rail of the optical cartridge of the present invention.

FIGS. 10C and 10D show the snap-close interface as the slide 103 is closed over the cartridge access openings 300, 400 for the spindle and optical head. FIG. 10F shows the sliding interface of the slide 103 in the slide rail 101. Although only a single side is shown in FIG. 10F, such interface is located on both sides of the optical disk cartridge assembly 10.

Figures 11, 12A, 12B:
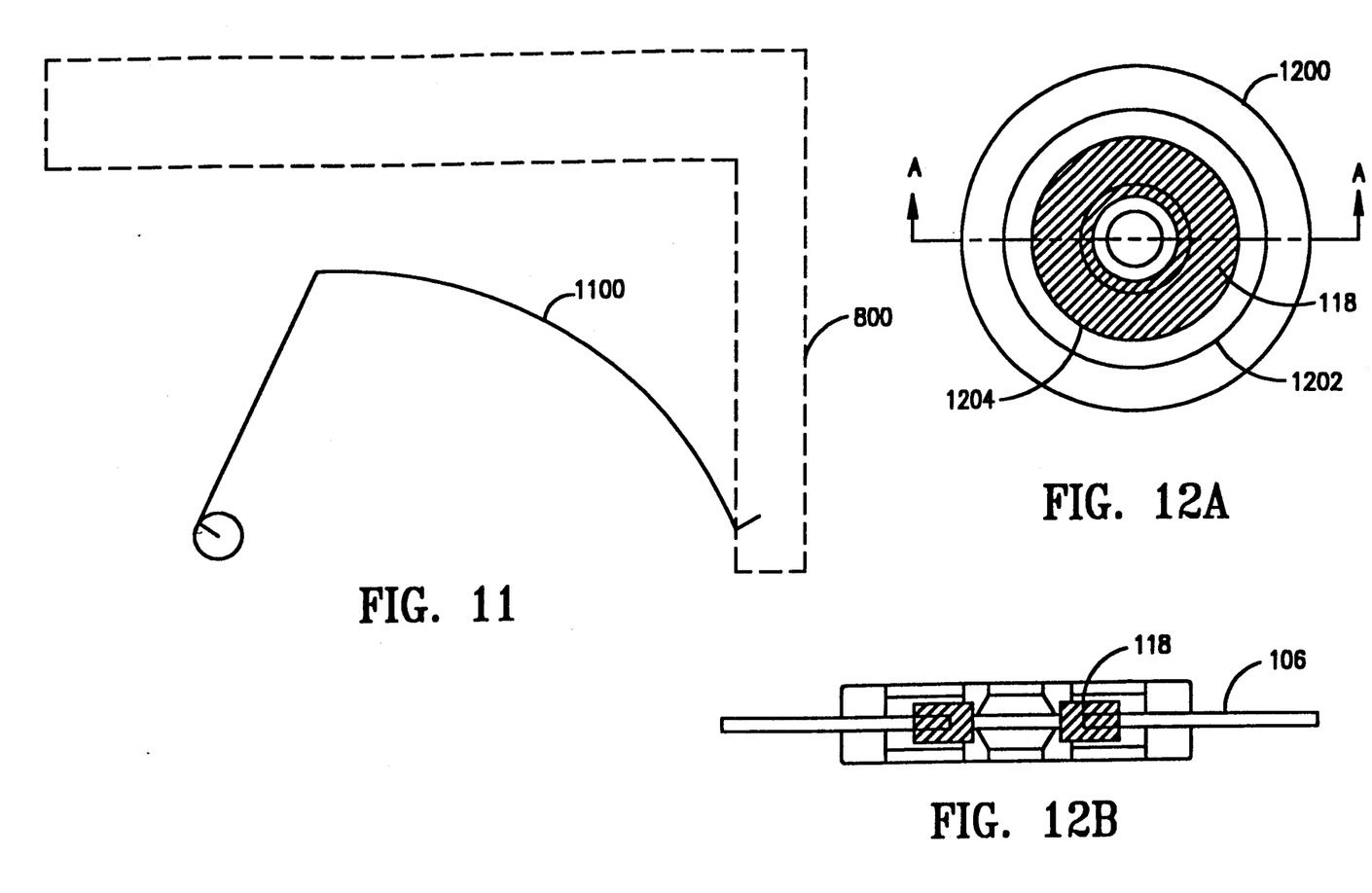
FIG. 11 is a drawing of a top view of the latch return spring utilized with the optical disk cartridge of the present invention.
FIG. 12A is a drawing showing the top view of a clamping hub assembly for use with the optical disk cartridge of the present invention.
FIG. 12B is a drawing taken along the lines A—A of FIG. 12A.

FIG. 11 shows a preferred latch return spring 1100 configuration which provides the required force in both the vertical and horizontal directions to return the latch 800 to its locked position. Obviously, other possible configurations for the latch return spring 1100 will come readily to mind to those of ordinary skill in the art. The latch return spring 1100 is secured at one end to the latch 800 and is secured at its other end to the cartridge bottom 108.

FIG. 12 shows a preferred design for the disk hub 118 which allows for the magnetic attachment of the disk assembly, including the disk 108, to the spindle motor (not shown) for the purpose of rotating the disk 106. In the design shown in FIGS. 12A and 12B, which complies with ANSI Standard X3B11/90-165, the hub 118 is included since it is a necessary component in the interface requirement for the optical cartridge 10 to any disk drive mechanism which also conforms to that standard.

As shown in FIG. 12A, a clamping ring 1204 is secured to the hub 118 in a known manner. A magnetizable ring 1202 is secured to the clamping ring 1204, also in a known manner. Finally, a hub clamp 1200 is secured to the magnetizable ring 1202, again in a known manner.

As disclosed herein, the light-tight optical disk cartridge conforms to all of the standards of the American National Standards Institute (ANSI) standards for a 130 millimeter rewritable optical data storage disk/cartridge assembly, as those standards are set forth in ANSI document X3B11/90-165.

The optical disk cartridge 10 of the present invention includes a light baffle molded into one side of the cartridge which mates with an edge seam molded into the other side of the cartridge to form a snap lock closure. Such features serve to provide structural integrity to the cartridge as well as a light controlled enclosure for the ETOM (or other) optical disk contained within the cartridge.

In addition, a snap close slide and latching mechanism is incorporated in order to prevent accidental opening of the access mechanism of the cartridge. The slide mechanism covers both the disk access area and the spindle hub, thus eliminating the need for additional openings in the cartridge in order to accommodate the spindle mechanical interface. The light-tight optical cartridge disclosed herein is designed to be injection molded for low cost and ease of manufacture. The snap lock feature of the instant application provides for an easy, no tools assembly. The present invention thus provides a much improved optical disk cartridge design over the optical disk cartridges known today which use corner pins or screws for fastening the components of the optical disk cartridge together.

As will be obvious to those of ordinary skill in the art, other formats for ETOM erasable or other optical disks, such as 90 millimeter and 60 millimeter diameter disks, can be made readily by modifying the optical disk cartridge disclosed herein in order to allow for the various format size disks.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A removable optical disk cartridge for providing a light-tight environment for an optical disk, comprising:
   top and bottom disk cartridge portions secured together by a continuous light-tight seam structure;
   an optical disk rotatably secured within said secured together top and bottom disk cartridge portions;
   a slide rail having a top portion located on said top disk cartridge portion and a bottom portion located on said bottom disk cartridge portion; and
   a slide movably secured to said top and bottom portions of said slide rail by an edge baffle structure, wherein said edge baffle structure is light-tight and wherein an edge of said slide fits snugly into a baffle formed as part of said slide rail to form at least one light-tight edge baffle structure which prevents light from penetrating into said removable optical disk cartridge when said slide is in a closed position.

2. The removable optical disk cartridge of claim 1, further including means for preventing the opening of said slide when said removable optical disk cartridge is outside of an optical disk drive.

3. The removable optical disk cartridge of claim 2, wherein said means for preventing the opening of said slide comprises a slide latch assembly secured at a front end of said removable optical disk cartridge.

4. The removable optical disk cartridge of claim 1, wherein said light-tight seam structure is comprised of an edge bead formed in one of said top and bottom disk cartridge portions and a receiving light baffle formed in the other of said top and bottom disk cartridge portions.

5. The removable optical disk cartridge of claim 4, wherein said edge bead and said receiving light baffle snap securely together.

6. The removable optical disk cartridge of claim 1, wherein said slide, when in an open position, permits access to said optical disk by both a spindle drive mechanism and drive optics for operatively utilizing said optical disk.

7. The removable optical disk cartridge of claim 1, wherein said optical disk is an ETOM optical disk.

8. The removable optical disk cartridge of claim 1, further including at least one write protect tab provided on at least one side of said optical disk cartridge.

9. The removable optical disk cartridge of claim 1, wherein said edge baffle structure of said slide is light-tight and includes a soft snap mechanism for maintaining said slide in a closed position.

10. The removable optical disk cartridge of claim 1, wherein said edge baffle structure of said slide is formed by a rounded edge on said slide meeting with a groove in said slide rail.

11. A method for providing a light-tight removable optical disk cartridge for an optical disk rotatingly secured within said disk cartridge, comprising the steps of:
assembling said cartridge from top and bottom disk cartridge portions using a continuous light-tight seam structure to secure together said top and bottom disk cartridge portions;
securing a top and a bottom slide rail respectively, to said top and bottom disk cartridge portions; and
slidably securing a slide to said top and bottom slide rails by means of a light-tight seam edge such that said light-tight seam edge and said top and bottom slide rails prevent any light from entering said light-tight removable optical disk cartridge.

12. The method of claim 11, further including the step of providing a slide latch mechanism to prevent the accidental opening of said slide.

13. The method of claim 11, further including the step of forming a continuous edge in one of said top and bottom disk cartridge portions and forming a corresponding continuous groove of light baffles in the other of said top and bottom disk cartridge portions for receiving said continuous edge.

14. The method of claim 11, wherein said seam edge and said light baffle snap together.

15. The method of claim 11, further including the step of providing at least one write protect tab for at least one side of said light-tight removable optical disk cartridge.

16. A removable optical disk cartridge for providing a light-tight environment for an optical disk, comprising:
top and bottom disk cartridge portions secured together by a continuous light-tight seam structure;
an optical disk rotatably secured within said secured together top and bottom disk cartridge portions;
a slide rail having a top portion located on said top disk cartridge portion and a bottom portion located on said bottom disk cartridge portion; and
a slide movably secured to said top and bottom portions of said slide rail by an edge baffle structure, wherein said edge baffle structure of said slide is light-tight and includes a soft snap mechanism for maintaining said slide in a closed position.

17. The removable optical disk cartridge of claim 16, further including means for preventing the opening of said slide when said removable optical disk cartridge is outside of an optical disk drive.

18. The removable optical disk cartridge of claim 17, wherein said means for preventing the opening of said slide comprises a slide latch assembly secured at a front end of said removable optical disk cartridge.

19. The removable optical disk cartridge of claim 16, wherein said light-tight seam structure is comprised of an edge bead formed in one of said top and bottom disk cartridge portions and a receiving light baffle formed in the other of said top and bottom disk cartridge portions.

20. The removable optical disk cartridge of claim 19, wherein said edge bead and said receiving light baffle snap securely together.

21. The removable optical disk cartridge of claim 16, wherein said slide, when in an open position, permits access to said optical disk by both a spindle drive mechanism and drive optics for operatively utilizing said optical disk.

22. The removable optical disk cartridge of claim 16, wherein said optical disk is an ETOM optical disk.

23. The removable optical disk cartridge of claim 16, further including at least one write protect tab provided on at least one side of said optical disk cartridge.

24. The removable optical disk cartridge of claim 16, wherein said edge baffle structure of said slide is formed by a rounded edge on said slide meeting with a groove in said slide rail.

* * * * *